United States Patent [19]
Terwilliger et al.

[11] Patent Number: 5,096,213
[45] Date of Patent: Mar. 17, 1992

[54] COLLET ASSEMBLY

[75] Inventors: Donald N. Terwilliger, Millerton, Pa.; Douglas E. Brackley, Horseheads, N.Y.

[73] Assignee: Hardinge Brothers, Inc., Elmira, N.Y.

[21] Appl. No.: 575,907

[22] Filed: Aug. 31, 1990

[51] Int. Cl.⁵ .............................................. B23B 31/02
[52] U.S. Cl. ........................................ 279/51; 279/58
[58] Field of Search ...................... 279/46 R, 51, 58, 59

[56] References Cited

U.S. PATENT DOCUMENTS

| | | |
|---|---|---|
| 3,539,193 | 10/1968 | Parsons . |
| 4,214,766 | 7/1980 | Rall et al. . |
| 4,251,084 | 2/1981 | Franklin . |
| 4,856,797 | 8/1989 | Rall . |
| 4,858,938 | 8/1989 | Terwilliger et al. . |

FOREIGN PATENT DOCUMENTS

| | | | |
|---|---|---|---|
| 1371605 | 7/1964 | France | 279/51 |
| 614898 | 7/1978 | U.S.S.R. | 279/51 |
| 566092 | 12/1944 | United Kingdom | 279/58 |
| 202578B | 6/1979 | United Kingdom . | |

OTHER PUBLICATIONS

Advertisement in "Automatic Machining", Aug. 1990.

Primary Examiner—Daniel W. Howell
Attorney, Agent, or Firm—Shlesinger, Arkwright & Garvey

[57] ABSTRACT

A collet assembly comprises a collet head, a collet body and a mount for securing the collet head and the collet body to the spindle of a machine. The collet head has inside and outside surfaces and front and rear faces and the outside surface includes an outwardly flaring surface. The collet head includes an external annular groove and a hook portion adjacent the rear face. The hook portion extends radially outwardly from the axis of the collet head. The collet body has inside and outside surfaces, a tubular portion and a flange portion extending radially outwardly from the outside surface and axially beyond the collet head hook portion. The flange portion has an outside diameter substantially larger than the outside diameter of the tubular portion of the collet body. The flange portion has an inner annular groove and an adjacent hook portion. The collet head hook portion is positioned within the flange portion annular groove and the hook portion of the flange portion within the collet head annular groove. The mount has an outwardly flaring surface cooperating with the collet head such that the collet head segments close or open as the collet head is axially moved by the collet body. The mount surrounds the collet head and the flange portion for limiting the movement of the draw tube and the collet head.

19 Claims, 3 Drawing Sheets

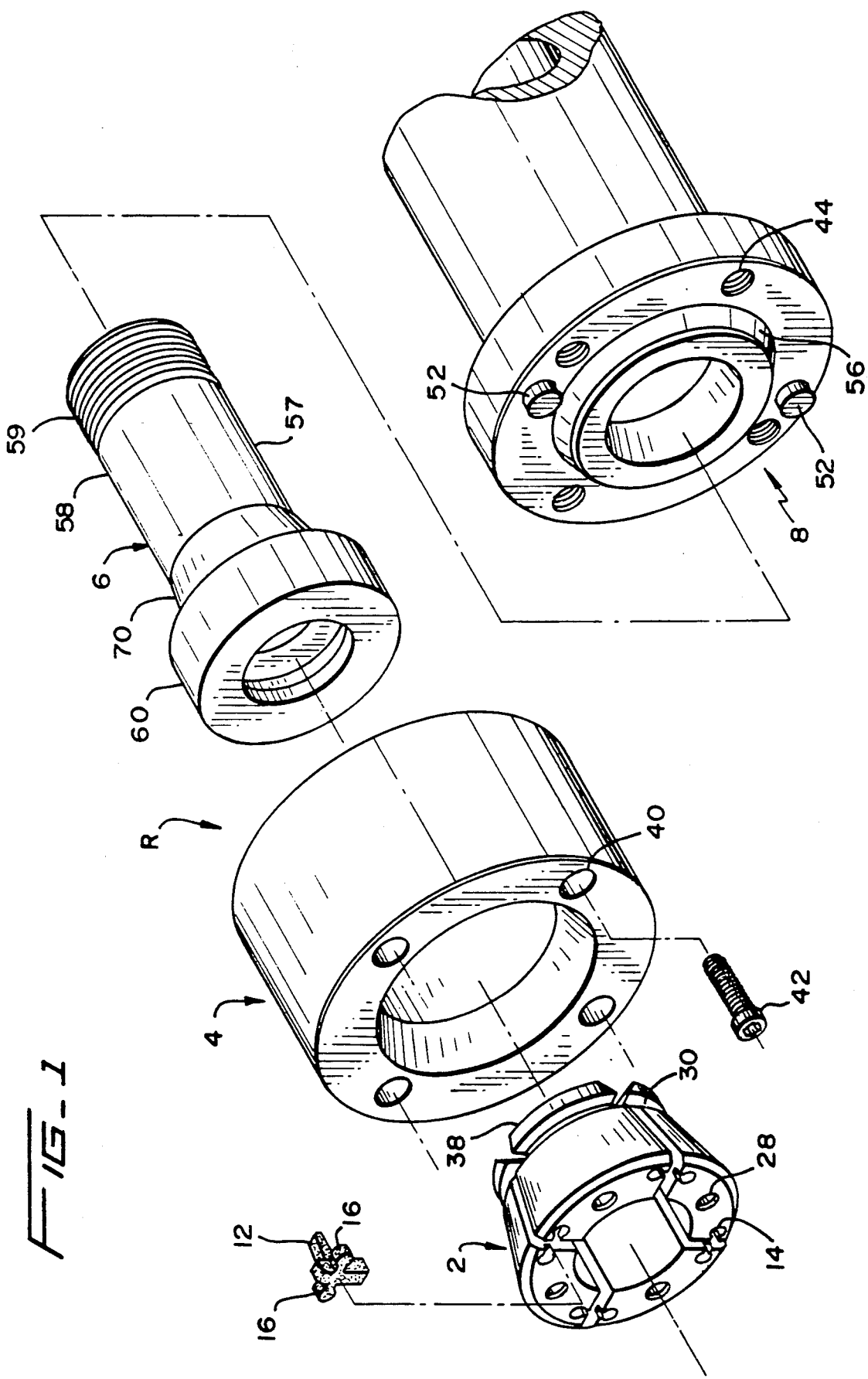

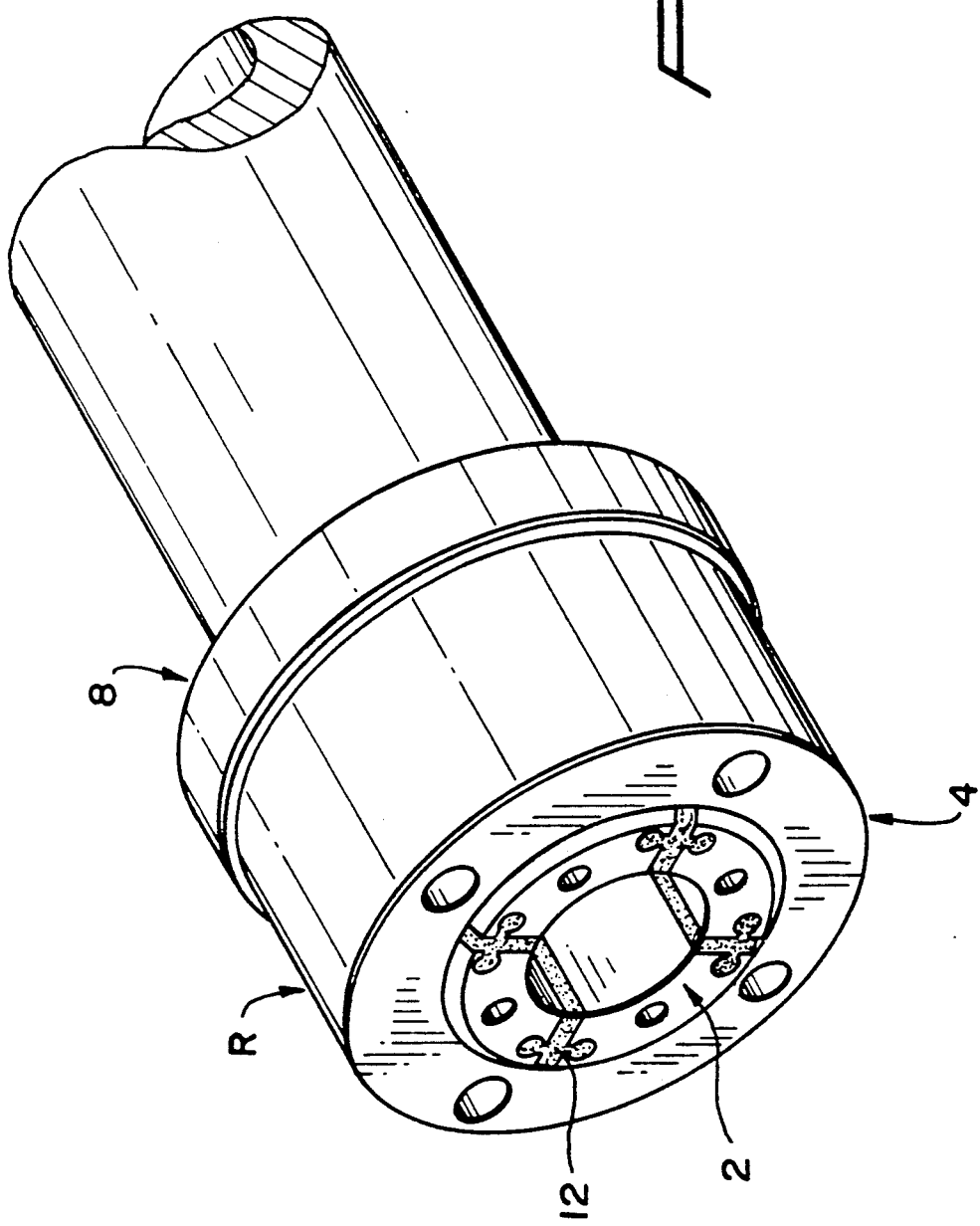

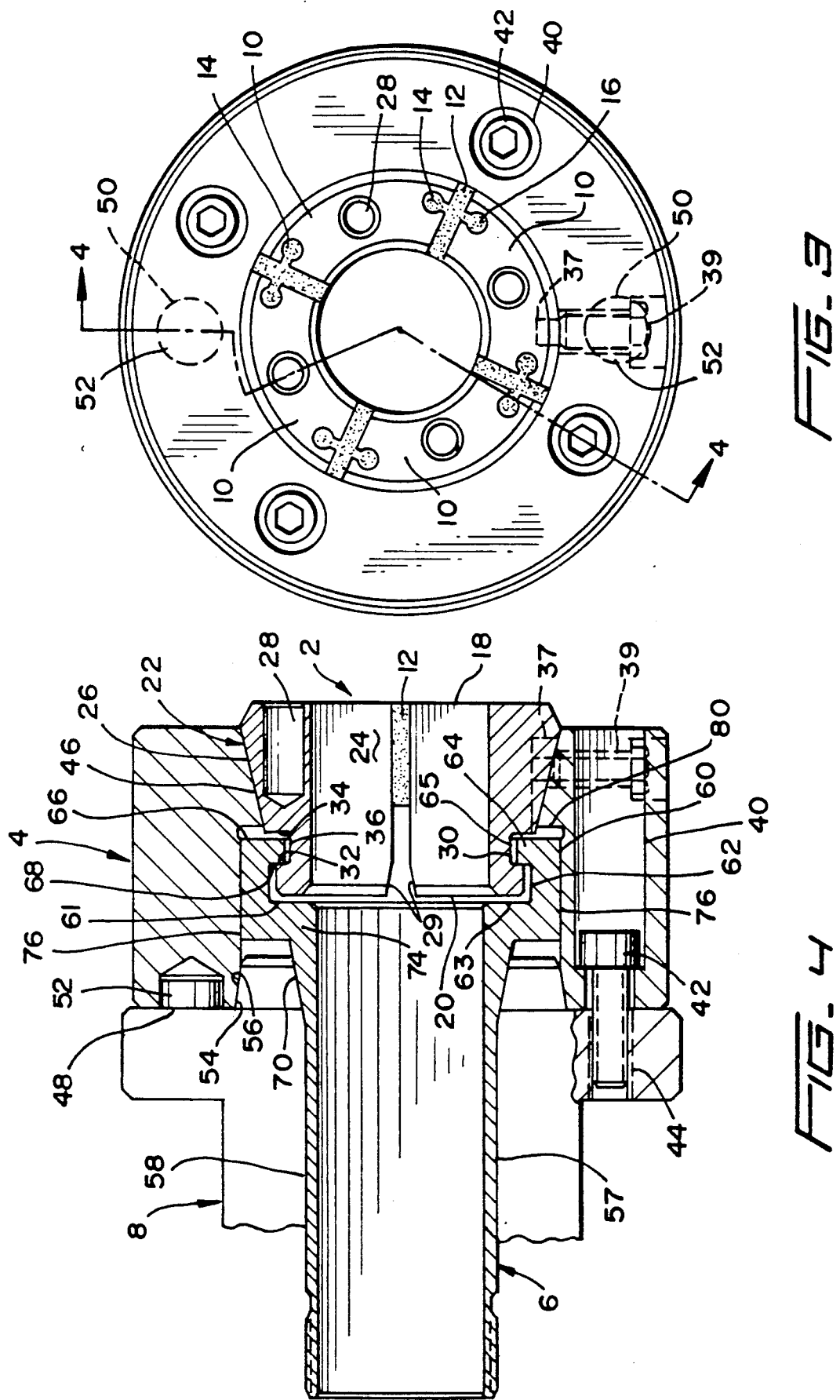

COLLET ASSEMBLY

The present invention relates generally to a machine collet and particularly to a collet assembly for use in holding a work piece on a turning machine, such as a lathe machine and the like.

BACKGROUND OF THE INVENTION

Collets are normally used in automated tool machines for holding work stocks, usually bar or rod stocks, for machining. A two-piece collet typically comprises a collet head having a plurality of work gripping segments and a collet body secured to the collet head for axially moving the collet head relative to the axis of the machine spindle. The spindle typically has a conical surface which cooperates with the conical surface on the collet head gripping segments. When the collet head is moved relative to the spindle, the work gripping segments will either close to grip or open to release the work stock. Spring means for spreading the work gripping segments when pressure is released is usually provided in the collet head.

A collet is typically more accurate and has greater gripping characteristic than a typical jaw chuck used in a typical lathe machine. A jaw chuck typically loses a substantial portion of its gripping pressure at relatively high rate of rotation due to centrifugal force. Therefore, where loss of gripping power cannot be tolerated, use of a collet on such a machine is usually advantageous, because a collet inherently retains its holding power even at relatively high rotational speed.

However, the jaw chuck cannot simply be replaced with a collet, since a lathe machine utilizing a jaw chuck is typically not designed to use a collet.

Therefore, there is a need to provide a collet assembly that will enable a jaw chuck machine to use a collet thereby to take advantage of the benefits of a collet.

OBJECTS AND SUMMARY OF THE INVENTION

It is therefore an object of the present invention to provide a collet assembly that can be used in a typical jaw chuck machine, thereby affording a user the advantages of a collet without requiring an additional machine.

It is also an object of the present invention to provide a collet assembly that is relatively simple to install and when installed does not substantially stick out from the spindle face, thereby maintaining substantially the original clearance of the machine.

It is still an object of the present invention to provide a collet assembly that includes a mounting fixture for securing the assembly to the spindle of a machine.

It is another object of the present invention to provide a collet assembly that includes a mounting fixture that is removably secured to the spindle of the machine.

It is yet another object of the present invention to provide a collet assembly that includes a collet body that has limited axial movement when secured to the spindle of a machine.

It is still further another object of the present invention to provide a collet assembly that permits replacement of the collet head while the assembly is secured to the machine.

It an object of the present invention to provide a collet assembly that includes a collet head that has replaceable sealing member between the collet segments.

It is another object of the present invention to provide a collet assembly that includes a mounting fixture that limits the axial travel of the collet head in either direction.

In summary, the present invention provides a collet assembly that includes a collet head, a collet body and a mounting fixture that permits the use of a collet head in a typical jaw chuck machine.

These and other objects of the present invention will become apparent from the following detailed description.

BRIEF DESCRIPTIONS OF THE DRAWINGS

FIG. 1 is an exploded view of a collet assembly according to the present invention for connecting to the spindle of a machine.

FIG. 2 is a front perspective view of the collet assembly of FIG. 1, shown installed to the spindle of the machine.

FIG. 3 is a front elevational view of a collet assembly according to the present invention.

FIG. 4 is a cross-sectional view of a collet assembly according to the present invention, taken along line 4—4 in FIG. 3, with the spindle of the machine shown in schematic view.

DETAILED DESCRIPTION OF THE INVENTION

A collet assembly R according the present invention comprises a collet head 2, a mounting fixture 4 and a collet body or draw tube 6, as best shown in FIG. 1. The collet assembly R is removably secured to a spindle 8 of a machine (not shown), as best shown in FIG. 2.

The collet head 2 comprises a plurality of identical segments 10 arranged in a circular manner, as best shown in FIG. 3. The collet head 2 preferably has 4 segments 10 for easier closing, greater range and more contact area. However, a person of ordinary skill in the art will understand that the collet head 2 may be made with greater or lesser number of segments.

Resilient compressible inserts 12 are each disposed between each of the segments 10. Each of the segments 10 includes a pair of lock recesses 14, each of which cooperates with a corresponding lock recess on an adjacent segment 10. A pair of corresponding lock recesses disposed on two adjacent segments 10 are thereby adapted to accept the corresponding lock ears 16 disposed on each of the resilient inserts 12. The lock ears 16 on each of the inserts 12, when inserted into each of the cooperating lock recesses on adjacent segments 10, will secure all the segments 10 together as a unit, as best shown in FIG. 3.

The collet head 2 has a front face 18, a rear face 20, an outside surface 22 and inside surface 24, as best shown in FIG. 4. The outside surface 22 includes an outwardly flaring conical surface 26. Each of the segments 10 includes an extraction hole 28 for cooperating with a tool (not shown) for removal or installation of the collet head 2 from the collet body 6. Each of the segments 10 includes a tapered surface 29 adjacent the rear face 20, as best shown in FIG. 4.

The collet head 2 includes an annular groove 30 disposed near its rear face 20. The annular groove 30 has opposing side walls 32 and 34 and a base wall 36. A substantially cylindrical hook portion 38 is formed between the groove 30 and the rear face 20 of the collet head 2.

A key way 37 disposed in one of the head segments 10 cooperates with a set screw 39 secured in the mounting fixture 4. The key way 37 stops short of the front face 18 of the head 2 to advantageously prevent debris, dirt and other foreign matter from getting into the collet head 2, as best shown in FIG. 4.

The mounting fixture 4 is a sleeve member secured to the spindle 8 with a plurality of holes 40 cooperating with respective bolts 42, such as socket head cap screws, and threaded holes 44 in the spindle 8. The mounting fixture 4 has an outwardly flaring conical surface 46 that cooperates with the surface 26 on the collet head 2. The mounting fixture 4 has a rear face 48 on which is disposed a pair of holes 50 that cooperate with a pair of projections on the spindle 8, as best shown in FIGS. 3 and 4. An inside tapered surface 54 adjacent the rear face 48 cooperates with a corresponding tapered surface 56 on the spindle 58 for providing a centering means when the mounting fixture 4 is secured to the spindle 8.

The collet body 6 has a tubular portion 57, an outside surface 58 and a flange portion 60 extending radially outwardly from the tubular portion 57 and axially beyond the hook portion 38 of the head 2. The flange portion 60 has an outside diameter substantially larger than the diameter of the tubular portion 57. The end portion of the collet body 6 has threads 59. The flange portion 60 includes an inside annular groove 62 that interlocks with the head hook portion 38 in a loose fitting fashion provided by the clearance generally indicated at 61. The flange portion 60 has a hook portion 64 adjacent the groove 62 that fits loosely within the groove 30 due to clearance generally indicated at 65. The clearances 61 and 65 advantageously permit the segments 10 to remain parallel to each other over a wider range of distances, thereby increasing the range of the collet head 2. The clearances 61 and 65 also permit the removal or installation of the collet head 2 from the collet body 6 and the mount 4, as will be described below.

The groove 62 has a rear wall 63 that is parallel to and over a portion of the rear face 20 of the collet head 2.

The hook portion 64 has an outside surface 66 and an inside surface 68 that are transverse to the axis of the collet body 6. The surface 66 extends substantially beyond the front wall 34 of the groove 30 and above a substantial portion of the surface 26, as best shown in FIG. 4. A tapered surface 70 on the outside surface 58 of the collet body 6 provides reinforcement.

The flange portion 60 has a substantially C-shaped cross-section including a body portion 74, top and bottom arm portions 76, and top and bottom end portions 78, as best shown in FIG. 4. The body portion 74 and top and bottom end portions 78 are substantially transverse to the axis of the collet body 6. The top and bottom arm portions 76 are substantially parallel to the axis of the collet body 6.

OPERATION

In operation, the collet assembly R is secured to the spindle 8, with the mounting fixture 4 enclosing the head 2 and the collet body 6, as best shown in FIGS. 2 and 4. The collet body 6 is axially movable between a first position where the head 2 is in a closed position for gripping a work piece and a second position where the head 2 is in an open, non-gripping position relative to the work piece.

In the first position, as best shown in FIG. 4, the head 2 applies pressure on a portion of the work piece disposed within the opening defined by the inner surface 24 of the head 2. The inner surface 68 of the hook portion 64 engages the groove sidewall 32 in the head 2.

To release the work piece from the collet head 2, the collet body 6 is moved axially outwardly, until the surface 66 contacts an inside surface 80 on the mounting fixture 4, as best shown in FIG. 4. As the head 2 moves outwardly, the segments 10 are urged radially by the resilient inserts 12, which have been under compression. The outward movement of the head segments 10, both axially and radially, releases the work piece.

The head 2 may be replaced while the collet assembly R remains secured to the spindle 8 by using a tool (not shown) such as that disclosed in U.S. Pat. No. 4,589,938. The tool is secured to the head 2 by means of the holes 28 on the front face 18 of the head 2. The tool is used to compress the rear portion of the segments 10 a sufficient distance radially inwardly such that the hook portion 38 clears the flange portion annular groove 62 and the hook portion 64. The clearance within the grooves 30 and 62 relative to the hook portions 64 and 38, respectively, advantageously facilitates the removal or installation of the head 2. Also, the tapered surfaces 29 on each of the segments 10 provide additional clearance between adjacent segments when the rear portion of the head is compressed. The resilient compressible inserts 12 permit the compression of the segments 10 during removal or installation. The same tool is used for installation of the head 2, using the removal procedure in the reverse direction.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:
1. A collet assembly, comprising:
   a) a collet head including inside and outside surfaces and front and rear faces;
   b) said outside surface including an outwardly flaring surface;
   c) said collet head including an external annular groove adjacent said rear face;
   d) said collet head having a hook portion adjacent said rear face and extending radially outwardly from the axis of said collet head;
   e) a collet body having inside and outside surfaces;
   f) said collet body including a flange portion extending radially outwardly from said outside surface and axially beyond said collet head hook portion;
   g) said flange portion having an inner annular groove and an adjacent hook portion;
   h) said collet head hook portion being positioned within said flange portion annular groove;
   i) said hook portion of said flange portion being positioned within said collet head annular groove;
   j) said collet body having a tubular portion and said flange portion having an outside diameter substantially larger than the diameter of said tubular portion;

k) a mount for securing said collet head and said collet body to a spindle;

l) said mount including an outwardly flaring surface cooperating with said collet head outwardly flaring surface for closing or opening said collet head when said collet head is moved axially by said collet body relative to said mount;

m) said mount surrounding said collet head and said flange portion and said mount including means for limiting axial movement of said collet head and said flange portion; and n) said mount is removably secured to the spindle.

2. An assembly as in claim 1, wherein:

a) said collet body hook portion is disposed loosely within said collet head groove; and b) said collet head hook portion is disposed loosely within said flange groove.

3. An assembly as in claim 2, wherein:

a) said hook portion of said flange portion is movable within said mount between a gripping position and a releasing position;

b) said collet head groove includes a base wall; and c) said hook portion of said flange portion is disposed away from said base wall by an increment when said flange portion is in said gripping position.

4. An assembly as in claim 3, wherein:

a) said mount includes an inside surface substantially transverse to the axis of said collet body;

b) said hook portion of said flange portion includes a surface substantially transverse to the axis of said collet body that engages said mount inside surface when said collet body is in said releasing position.

5. An assembly as in claim 3, wherein:

a) said hook portion of said flange portion includes an inner diameter greater than the diameter of said base wall of said collet head groove when said flange portion is in said gripping position.

6. An assembly as in claim 1, wherein:

a) said collet head groove has front and rear walls;

b) said front wall is disposed inwardly of said mount inside surface when said collet body is in said gripping position.

7. An assembly as in claim 1, wherein:

a) said flange portion comprises substantially a C-shaped cross-section including a body portion, top and bottom arm portions and top and bottom end portions;

b) said body and top and bottom end portions are substantially transverse to the axis of said collet body; and c) said arm portions are substantially parallel to the axis of said collet body.

8. An assembly as in claim 1, wherein:

a) said flange portion encloses said collet head rear face.

9. An assembly as in claim 1, wherein:

a) said mount includes at least an opening for cooperating with a respective dowel on the spindle.

10. An assembly as in claim 1, wherein:

a) said mount includes an end portion operably secured to the spindle; and b) said mount end portion includes a tapered inner surface cooperating with an exterior tapered surface on the spindle.

11. An assembly as in claim 1, wherein:

a) said mount comprises a sleeve.

12. An assembly as in claim 1, wherein:

a) said collet head comprises a plurality of segments arranged in a circular configuration forming spaced slots therebetween; and b) resilient compressible means disposed in each of said slots.

13. An assembly as in claim 12, wherein:

a) each of said segments includes on its left and right side faces a lock recess extending from said front face rearwardly towards said rear face; and b) said resilient means includes a laterally extending lock ears removably secured in respective lock recesses.

14. An assembly as in claim 12, wherein:

a) each of said segments includes an extraction hole on the front face thereof.

15. An assembly as in claim 12, wherein:

a) each of said segments includes left and right surfaces;

b) each of said segments includes a rear portion; and c) said left and right faces at said rear portion are tapered.

16. An assembly as in claim 1, wherein:

a) said flange portion groove has front, rear and base walls; and b) said front and rear walls are perpendicular and said base wall is parallel to the axis of said collet body.

17. An assembly as in claim 7, wherein:

a) said arm portion is parallel to and extends over a portion of said head rear face.

18. An assembly as in claim 1, wherein:

a) said collet head hook portion has an outside diameter larger than the diameter of said tubular portion.

19. A collet assembly, comprising:

a) a collet head including inside and outside surfaces and front and rear faces;

b) said outside surface including an outwardly flaring surface;

c) said collet head including an external annular groove adjacent said rear face;

d) said collet head having a hook portion adjacent said rear face and extending radially outwardly from the axis of said collet head;

e) a collet body having inside and outside surfaces;

f) said collet body including a flange portion extending radially outwardly from said outside surface and axially beyond said collet had hook portion;

g) said flange portion having an inner annular groove and an adjacent hook portion;

h) said collet head hook portion is disposed loosely axially and radially within said flange groove;

i) said collet body hook portion is disposed loosely axially and radially within said collet head groove;

j) said collet body having a tubular portion and said flange portion having an outside diameter substantially larger than the diameter of said tubular portion;

k) a mount for securing said collet head and said collet body to a spindle;

l) said mount including an outwardly flaring surface cooperating with said collet head outwardly flaring surface for closing or opening said collet head when said collet head is moved axially by said collet body relative to said mount;

m) said mount surrounding said collet head and said flange portion and said mount including means for limiting axial movement of said collet head and said flange portion; and n) said mount is removably secured to the spindle.

* * * * *